United States Patent
Arkko et al.

(10) Patent No.: US 9,525,749 B2
(45) Date of Patent: Dec. 20, 2016

(54) DNS SERVER ARRANGEMENT AND METHOD

(75) Inventors: Jari Arkko, Kauniainen (FI); Fredrik Garneij, Göteborg (SE); Christian Gotare, Getinge (SE); Tero Kauppinen, Espoo (FI); Heikki Mahkonen, Helsinki (FI); Jan Melen, Espoo (FI); Martti Kuparinen, Masala (FI); Heidi Hostikka, legal representative, Kirkkonummi (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 770 days.

(21) Appl. No.: 13/885,304

(22) PCT Filed: Nov. 17, 2010

(86) PCT No.: PCT/EP2010/067680
§ 371 (c)(1),
(2), (4) Date: Sep. 2, 2014

(87) PCT Pub. No.: WO2012/065641
PCT Pub. Date: May 24, 2012

(65) Prior Publication Data
US 2015/0074221 A1    Mar. 12, 2015

(51) Int. Cl.
*G06F 15/167* (2006.01)
*H04L 29/08* (2006.01)
*H04L 29/12* (2006.01)
*G06F 9/455* (2006.01)

(52) U.S. Cl.
CPC ....... *H04L 67/2842* (2013.01); *G06F 9/45533* (2013.01); *G06F 15/167* (2013.01); *H04L 29/12066* (2013.01); *H04L 29/12132* (2013.01); *H04L 61/1511* (2013.01);
(Continued)

(58) Field of Classification Search
CPC H04L 29/12; H04L 29/12811; H04L 67/2842; H04L 61/1511; H04L 61/1552; H04L 61/6009; H04L 29/12066; H04L 29/12132; G06F 9/45533; G06F 15/167
See application file for complete search history.

(56) References Cited

U.S. PATENT DOCUMENTS

2004/0132451 A1 * 7/2004 Butehorn ............. H04B 7/1856
455/445
2007/0195800 A1 * 8/2007 Yang ................. H04L 29/12066
370/401

(Continued)

*Primary Examiner* — Benjamin M Thieu

(57) ABSTRACT

The present invention relates to a Domain Name System (DNS) server and a method for resolving DNS queries from a number of clients. The DNS server comprises multiple virtual DNS server instances servicing different clients. The DNS server further comprises a shared cache for caching records which indicate answers to resolved DNS queries. The shared cache is shared between a set of virtual DNS server instances. The virtual DNS server instances that share the shared cache are able to cache DNS query results in the shared cache as well as resolve a DNS query by retrieving a cached record corresponding to the DNS query from the shared cache. Thus it is possible for a virtual DNS server instance to make use of DNS query results obtained by other virtual DNS server instances.

13 Claims, 3 Drawing Sheets

(52) U.S. Cl.
CPC .... *H04L 61/1552* (2013.01); *H04L 29/12811* (2013.01); *H04L 61/6009* (2013.01)

(56) References Cited

U.S. PATENT DOCUMENTS

| | | | |
|---|---|---|---|
| 2008/0101358 A1* | 5/2008 | Van Ewijk | H04L 29/12132 370/389 |
| 2009/0031028 A1* | 1/2009 | Kumar | H04L 63/0272 709/227 |
| 2009/0043900 A1 | 2/2009 | Barber | |
| 2010/0199122 A1 | 8/2010 | Sood | |

* cited by examiner

DNS SERVER ARRANGEMENT AND METHOD

TECHNICAL FIELD

The present invention relates to the Domain Name System (DNS) and in particular to methods and arrangements for supporting resolution of DNS queries.

BACKGROUND

The Domain Name System (DNS) is often referred to as the phone book of the Internet. DNS is a hierarchical naming system that resolves domain names meaningful to humans into IP addresses associated with computers, services and other resources connected to the Internet or private networks.

The DNS system makes it possible to hide information about location and IP-addresses of Internet resources from users. The users may use domain names that are assigned to groups of Internet resources independent of the resources physical location. Thus contact information in the form of e.g. e-mail addresses and Uniform Resource Locators (URLs) may remain consistent even if routing arrangements in the Internet or the resources physical location change.

The responsibility for assigning domain names and mapping those domain names to IP addresses is distributed to authoritative name servers for each domain. An authoritative name server is able to assign the responsibility for sub-domains, within the domain the authoritative name server is responsible for, to other lower level authoritative name servers. Thus the DNS is a distributed, hierarchical system that does not require maintaining a single central register.

A DNS server is a server that stores DNS records for a domain name and responds with answers to queries against its stored DNS records. The DNS server may be an authoritative name server that gives answers that have been configured by an original source, e.g. a domain administrator. This is in contrast to answers that are obtained by a DNS query to another DNS server. There are many different types of DNS records that are used for different purposes. Some examples of DNS record types are address records, name server records and mail exchanger records. Different codes have been defined to refer to different types of DNS records. A is for instance the code that is used to denote an IPv4 address record and AAAA is the code that is used for an IPv6 address record.

DNS is a distributed database system that uses a client-server model and the DNS servers can be seen as nodes of the distributed database system. A query to a DNS server may be resolved (i.e. answered) recursively. This means that if the DNS server does not store the DNS record required for resolving the DNS query from a client, the DNS server may issue a DNS query to another DNS server and then provide an answer to the client based on the answer from the other DNS server.

To improve efficiency and reduce DNS traffic across the Internet DNS servers may cache (i.e. store locally) DNS query results for a period of time that may be determined in configuration of a DNS record in question. Such a configured period of time is called the time-to-live, TTL, of the DNS record.

The United States Patent Application Publication No. US 2009/0043900 A1 discloses a DNS server that supports a plurality of virtual DNS servers. A plurality of network capable devices is configured to connect with particular virtual DNS servers for domain name resolution. Thus the concept of virtual DNS servers may make it is possible for an administrator to make configurations such that each customer/client is given their own virtual DNS server. Examples of other terms that are used to refer to a virtual DNS server are DNS server context or virtual DNS server instance.

With the introduction of IPv6 a need for translation between IPv6 and IPv4 arose. DNS64 is a logical function that synthesizes DNS resource records (e.g. AAAA records) from DNS resource records actually contained in the DNS (e.g. A records). The DNS 64 function may be used with an IPv6/IPv4 translator to enable client-server communication between an IPv6-only client and an IPv4-only server. A DNS64 server is a server that provides the DNS64 function. DNS query roundtrip is often a major factor in the delay for end users' connection setup. Thus a long DNS query roundtrip may be a problem that limits the performance of the end users' applications. Therefore it is beneficial if DNS servers are arranged to enable as fast and efficient resolution of DNS queries as possible to make it possible to keep the DNS query roundtrip as low as possible.

SUMMARY

An object of the present invention is to provide a method and an apparatus that provide support for resolving DNS queries in an efficient manner.

The above stated object is achieved by means of a DNS server and a method according to the independent claims.

A first embodiment of the invention provides a DNS server for use in a data network. The DNS server is suitable for resolving DNS queries from a number of clients. The DNS server comprises a plurality of virtual DNS server instances servicing different clients. The DNS server further comprises a shared cache for caching records which indicate answers to resolved DNS queries. The shared cache is shared between a set of multiple virtual DNS server instances. The set of multiple virtual DNS server instances share the shared cache in such a way that each virtual DNS server instance in the set of multiple virtual DNS server instances is able to cache records associated with DNS queries, which have been resolved by the respective virtual DNS server instance, in the shared cache. Furthermore the shared cache is shared in such a way that each virtual DNS server instance in the set of multiple virtual DNS server instances is able to resolve a DNS query by retrieving a cached record corresponding to the DNS query from the shared cache.

A second embodiment of the invention provides a method in a DNS server for resolving DNS queries from a number of clients in a data network. The method comprises a step of receiving a first DNS query from a first client. In a next step of the method a first virtual DNS server instance is determined, from a plurality of virtual DNS server instances of the DNS server, for resolving the first DNS query. Then the first virtual DNS server instance searches for a record corresponding to the first DNS query and indicating an answer to the first DNS query in a shared cache. The shared cache is shared between a set of multiple virtual DNS server instances of the DNS server. In a further step of the method the first DNS query is resolved by retrieving the record corresponding to the first DNS query from the shared cache if the record corresponding to the first DNS query was found in the shared cache.

An advantage of the embodiments described above is that they allow for sharing of DNS query results between several virtual DNS server instances. Such sharing may e.g. lead to better utilization of network resources, reduced traffic related to DNS queries in the data network, reduced DNS query roundtrip, and improved performance for an end-user's application, for instance by reduced delay in connection set-up.

Another advantage according to certain of the embodiments described herein is that an operator may use one physical DNS server node with a plurality of virtual DNS server instances to serve multiple customers with their own customer specific settings while sharing DNS query results that are not customer specific.

A further advantage according to some of the embodiments described herein is that by utilizing both shared and private caches it is possible to achieve a separation of DNS query results suitable for sharing and DNS query results not suitable for sharing.

Yet another advantage according to certain of the embodiments described herein, which use a plurality of shared caches, is that a plurality of shared caches allows for a better control of sharing of DNS query results since e.g. some results may be suitable for sharing with some virtual DNS server instances but not with others, while other results may be suitable for sharing with all virtual DNS server instances.

Further advantages and features of embodiments of the present invention will become apparent when reading the following detailed description in conjunction with the drawings.

DETAILED DESCRIPTION

Figure 1:
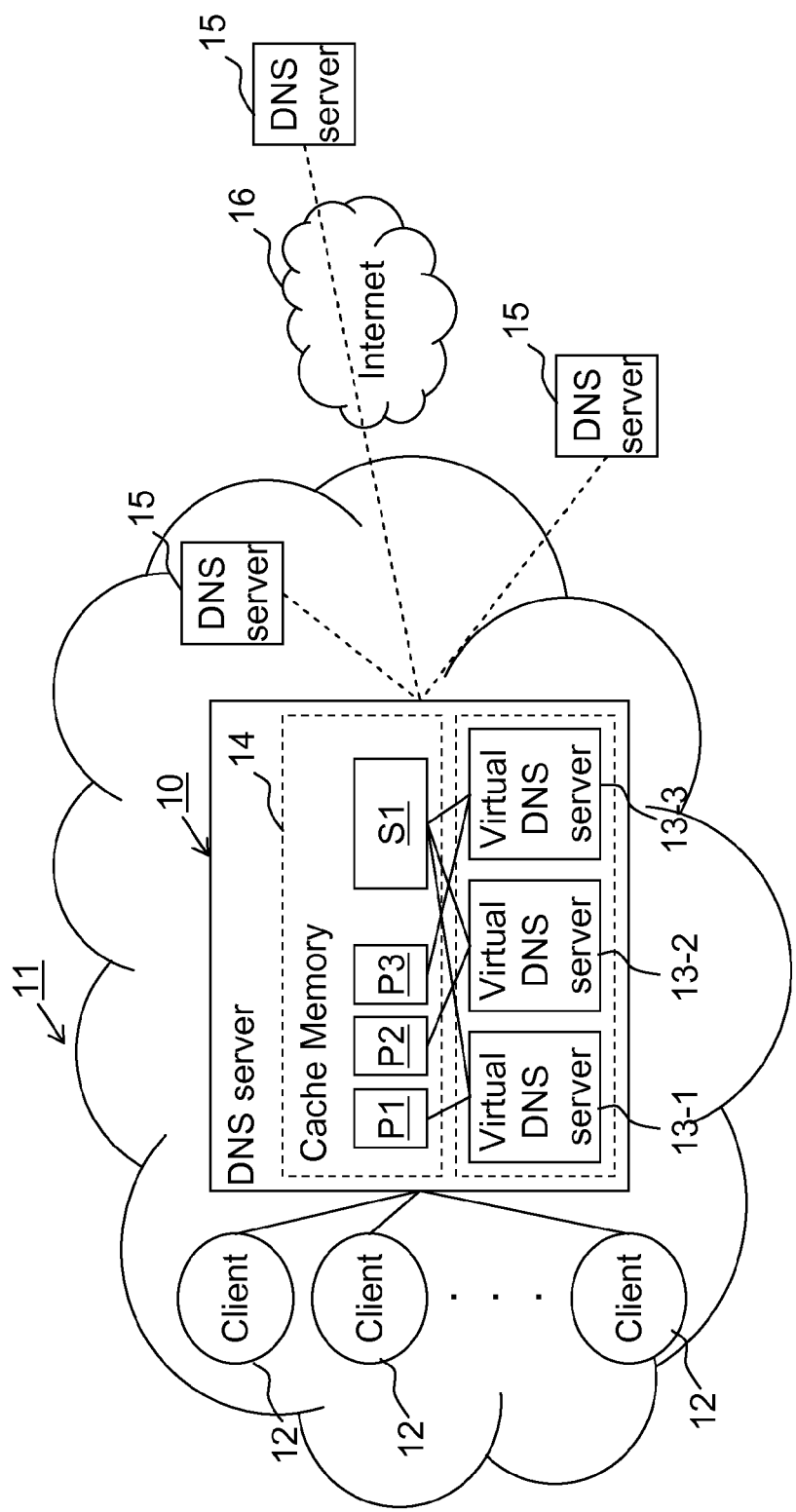
FIG. 1 is a schematic block diagram illustrating a data network including an embodiment of a DNS server.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Simply following the IETF (Internet Engineering Task Force) Internet-Draft entitled "DNS64: DNS extensions for Network Address Translation from IPv6 Clients to IPv4 Servers draft-ietf-behave-dns64-9" dated Mar. 30, 2010 leads to an implementation where each virtual DNS server instance is unaware of other virtual DNS server instances. Thus each of the instances sends DNS queries independent of each other and the instances are not able to utilize any information already fetched by other instances. The inventors have realized that it would be better if DNS query results could be shared among the virtual DNS server instances in those cases where such sharing is possible and appropriate.

According to embodiments to be described in further detail below, a single or multiple physical DNS server node(s) act(s) as a group of virtual DNS server instances. These virtual DNS server instances could share some or all of the DNS query results to improve hardware resource usage and/or speed. Even though the virtual DNS server instances could share DNS query results by means of a shared cache the instances could at the same time also, according to certain embodiments, have a respective private cache that is used to cache a DNS query result that is not suitable for sharing e.g. since it may be a customer specific result related to a customer internal network.

As indicated above, embodiments of the present invention are applicable in DNS server implementations consisting of a single physical DNS server node as well as implementations comprising multiple physical DNS server nodes. The term "DNS server" will be used herein and is intended to encompass DNS servers implemented in a single physical DNS server node as well as distributed DNS servers implemented in multiple co-operating physical DNS server nodes. Therefore in schematic block diagrams illustrating a DNS server as a single box, it is to be understood that this is primarily an illustration of the DNS server as a single functional unit. The physical implementation of the DNS server may however according to certain embodiments be distributed over several physical nodes.

FIG. 1 is a schematic block diagram illustrating a data network 11 including an embodiment of a DNS server 10. The DNS server is configured to resolve DNS queries received from a number of different clients 12. The clients 12 may be individual end users or companies, as well as other DNS servers. In general the clients 12 may be any type of node or software module that uses DNS for resolving binding between domain names and IP addresses. The DNS server 10 includes a number of virtual DNS server instances 13-1, 13-2, 13-3. In FIG. 1 three different virtual DNS server instances are illustrated. However, other embodiments of the DNS server 10 may include fewer or more virtual DNS server instances. An operator may have configured the DNS server such that a particular virtual DNS server instance 13-1, 13-2, 13-3 is configured to resolve DNS queries from a particular client or set of clients 12. Thus the virtual DNS server instances 13-1-13-3 may be provided with different customer settings associated with the particular client(s) 12 that the different virtual DNS server instances are configured to service.

If the DNS server 10 is a DNS64 server, i.e. a server that provides a DNS64 function. Each virtual DNS server instance would be provided with its own Pref64 prefix and other configuration values such as an IP address of a root DNS server. Pref64 is an IPv6 prefix that is used with synthesized AAAA addresses.

When the DNS server 10 receives a DNS query from a client 12 it is determined which virtual DNS server instance 13-1, 13-2, 13-3 that the DNS query belongs to, i.e. which virtual DNS server instance that is to resolve the DNS query. The virtual DNS server instance to resolve the DNS query may be determined based on a source address of the DNS query. Other means than the source address may be used for determining the virtual DNS server instance. However, in order to avoid problems, the determination should always give a deterministic result and should not cause that in a case of the client resending the DNS query, the DNS query ends up on a different virtual DNS server instance. Examples of alternatives to the source address as the basis for the determination of the virtual DNS server instance to handle the DNS query are Media Access Control (MAC) headers, tunneling headers, and International Mobile Subscriber Identity (IMSI) depending on the surrounding environment of the DNS server.

When the virtual DNS server instance to handle the DNS query has been found the determined virtual DNS server instance works on resolving the DNS query. Therefore the virtual DNS server instance searches for a record that indicates an answer to the DNS query. Such a record may be found in a cache memory 14 of the DNS server or stored in another DNS server 15. It is natural to implement the virtual DNS server instance to first search for the record in the cache memory since that is the quickest place from which the answer to the DNS query could be obtained. If the virtual DNS server instance could not find any record that indicates an answer to the query in the cache memory, one or several of the other DNS servers 15 could be queried for a result to the DNS query. As illustrated in FIG. 1 the other DNS servers 15 may be DNS servers located in the same data network 11 or in some other data network connected to the data network 11. It is possible that the other DNS network is contacted via the Internet 16.

According to embodiments presented herein the cache memory 14 may include a shared cache S1 that is shared between several of the virtual DNS server instances. In the exemplary embodiment illustrated in FIG. 1 all of the virtual DNS server instances 13-1, 13-2 and 13-3 share the shared cache S1. The virtual DNS server instances may cache records that indicate answers to resolved DNS queries, i.e. DNS query results, in the shared cache. Thus when one of the virtual DNS server instances is to resolve a new DNS query that it has not resolved before, it can search for an answer to the new DNS query in the shared cache S1 and may be able to find the answer to the new DNS query in the shared cache S1 if one of the other virtual DNS server instances has resolved the same or a corresponding DNS query before.

The cache memory 14 may also optionally include a number of private caches that are accessible only by a respective virtual DNS server instance. In FIG. 1 it is illustrated that the virtual DNS server instance 13-1 is associated with a private cache P1, the virtual DNS server instance 13-2 is associated with a private cache P2, and the virtual DNS server instance 13-3 is associated with a private cache P3. The private caches are intended for caching DNS query results that are only relevant to the associated virtual DNS server instance.

An example of a method for resolving a DNS query that the DNS server 10 receives will now be explained. In this example it is assumed that the DNS server 10 is a DNS64 server and that it has already been determined that the virtual DNS server instance 13-1 is to handle the DNS query. The steps of the exemplary method are as follows:

1. If a valid record corresponding to the DNS query exists in the private cache P1, retrieve the record and proceed to step 5.
2. If a valid record corresponding to the DNS query exists in the shared cache S1, retrieve the record and proceed to step 5.
3. Send an outgoing query to another DNS server 15 and wait for a response.
4. If the response from the DNS server 15 includes a record indicating an answer to the query, retrieve the record and cache the record in the private cache or in the shared cache depending on instance policy configuration of the virtual DNS server instance 13-1.
5. Parse the retrieved record and generate a synthesized answer using the Pref64 prefix associated with the virtual DNS server instance 13-1. Deliver the generated synthesized answer to the client. The synthesized answer is usually not cached but in some cases also this could be cached in to the private cache P1. It should not be cached in to the shared cache as Pref64 is different for different virtual DNS server instances.

In the exemplary method described above a valid record corresponding to the DNS query is a record that is still valid based on its time-to-live (TTL), i.e. it has not timed out, and that indicates an answer to the DNS query. It is further to be understood that the generation of the synthesized answer using the Pref64 prefix relates to the DNS64 function of creating synthetic IPv6 addresses from shorter IPv4 addresses. Accordingly if the DNS server 10 does not provide a DNS64 function the synthesized answer would not have to be created.

Each virtual DNS server instance should be configured with instance policy configuration that govern which cache to use (private and/or shared) and through the instance policy configuration the sharing of DNS query results may e.g. be set to sharing of all DNS query results with all virtual DNS server instances, sharing of some DNS query results or sharing of no DNS query results. Thus it is possible that only a limited set of the virtual DNS server instances share the shared cache.

In the private cache P1 the virtual DNS server instance 13-1 stores DNS query results that are valid only for the virtual DNS server instance 13-1. This is controlled by the instance policy configuration of the virtual DNS server instance 13-1. The instance policy configuration contains information about how the DNS query results may or may not be shared. This information of the instance policy configuration may e.g. specify lists of domains for which DNS query results may be shared as well as domains for which DNS query results may not be shared.

Figure 2:
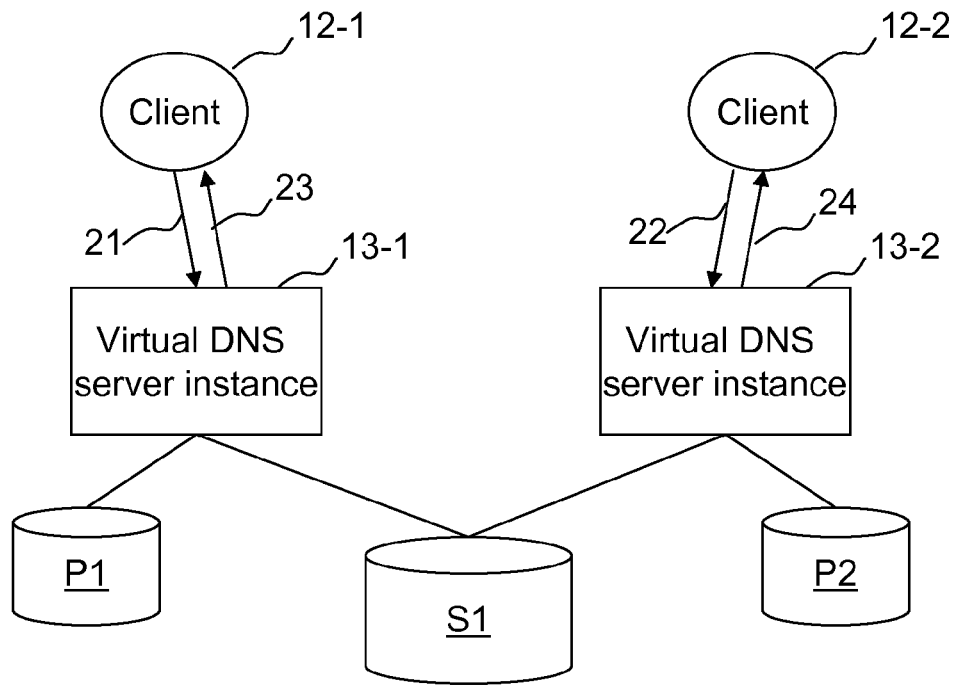
FIG. 2 is a schematic block diagram illustrating an embodiment in which virtual DNS server instances have access to a shared cache and respective private caches.

Now a simple exemplary usage scenario will be described in connection with FIG. 2 to illustrate an advantage of the shared cache. FIG. 2 is a schematic block diagram that shows two virtual DNS server instances with respective private caches: the virtual DNS server instance 13-1 with the private cache P1 and the virtual DNS server instance 13-2 with the private cache P2. The virtual DNS server instance 13-1 is configured to resolve DNS queries received from a client 12-1 and the virtual DNS server instance 13-2 is configured to resolve DNS queries received from a client 12-2. The two virtual DNS server instances 13-1, 13-2 have access to the shared cache S1. It is furthermore assumed in this exemplary usage case that the virtual DNS server instances provide a DNS64 function.

Assume that the client 12-1 sends a DNS query 21: "AAAA? www.domain.com" that is received by the virtual DNS server instance 13-1. The virtual DNS server instance 13-1 is unable to find an address record corresponding to the domain name www.domain.com in the private cache P1 or in the shared cache S1. Thus the virtual DNS server instance 13-1 sends out first query with the same type, AAAA, as the DNS query received from the client 12-1 to another DNS server 15 (see FIG. 1). However when the response to the first query is received, the answer section of the response is empty. Next the virtual DNS server instance 13-1 sends out a second query to the other DNS server 15 with the type A, and now one or more As are found in the answer section of the response to the second query. The DNS query and name (www.domain.com), are stored with the received response (A) in the shared cache S1, since it is assumed in this example that caching to the shared cache is allowed by configuration. The virtual DNS server instance 13-1 uses a Pref64 associated with the client 12-1 and creates a DNS response 23 with a synthesized AAAA answer. The original DNS query type (AAAA) and name (www.domain.com) may also be stored with the synthesized response (AAAA) in the private cache P1 if caching is requested according to the instance policy configuration of the virtual DNS server instance 13-1.

Next in this exemplary usage scenario the client 13-2 sends a DNS query 22: "AAAA? www.domain.com", which is received by the virtual DNS server instance 13-2. The virtual DNS server instance 13-2 is unable to find an address record corresponding to the domain name www.domain.com in the private cache P2, but it finds the cached copy of the response in the shared cache S1 that was previously stored by the virtual DNS server instance 13-1. The cached copy is used together with the Pref64 prefix of the virtual DNS server instance 13-2 to create a response 24 with a synthesized AAAA answer to the received DNS query 22. The created synthesized AAAA answer may be cached along with the original query (AAAA) type and name (www.domain.com) in the private cache P2 if private caching is requested according to the instance policy configuration of the virtual DNS server instance 13-2.

From the exemplary usage scenario above it can be seen that the virtual DNS server instance did not need to contact the other DNS server 15 in order to resolve the DNS query 22 since the answer could be found in the shared cache S1. This leads to a quicker DNS query roundtrip for the DNS query 22 and reduces traffic between the virtual DNS server instance 13-2 and the other DNS server 15.

Figure 3:
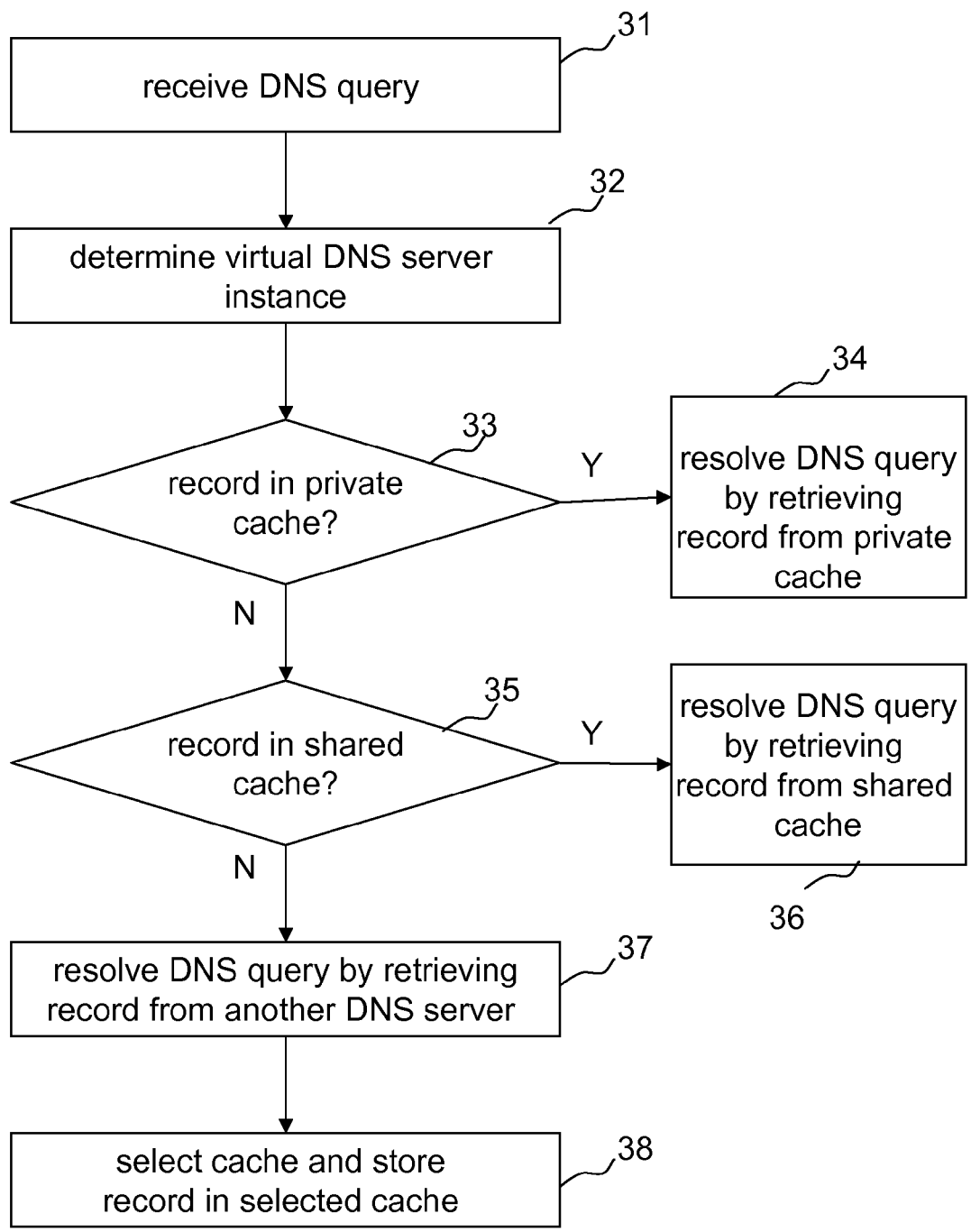
FIG. 3 is a flow diagram of an embodiment of a method for resolving a DNS query.

In the examples described above a DNS64 scenario was assumed. However embodiments of the present invention are not limited to just DNS64 type DNS queries. FIG. 3 is a flow diagram illustrating a method in a DNS server for resolving a DNS query according to an embodiment. In a step 31 the DNS query is received. In a step 32 it is determined which virtual DNS server instance that is to resolve the DNS query. This determination may be based on the source address of the DNS query or based on other information as discussed above. In a step 33 it is examined if a record, which corresponds to the DNS query and indicates an answer to the DNS query, can be found in the private cache of the determined virtual DNS server instance. If the record is found in the private cache, the DNS query is resolved in a step 34 by retrieving the record from the private cache. If the record is not found in the private cache, the shared cache is searched in a step 35. If the record is found in the shared cache the DNS query is resolved in a step 36 by retrieving the record from the shared cache. If the record is not found in the shared cache either, the DNS query is resolved by retrieving the record from another DNS server in a step 37. The record could also be cached in the private cache and/or in the shared cache in a step 38 depending on the configuration of the determined virtual DNS server instance.

Some embodiments may not make use of private caches or the possibility of resolving DNS queries with the help of other DNS servers. Thus steps 33, 34, 37 and 38 are optional according to some embodiments. If the DNS server is unable to resolve the DNS query the client should preferably be informed of this. It is also possible according to other embodiments to change the order of some of the method steps illustrated in FIG. 3 such as e.g. step 33 and step 35. It is usually a natural choice to search for a record in the private cache first. However, e.g. if it is known from the instance policy configuration that the result of a particular DNS query relating to a particular domain is to be saved in a shared cache but not in a private cache, then it can also be expected that it is in the shared cache that a record indicating an answer to the particular DNS query might be found. Then this knowledge might be used to search the shared cache prior to the private cache or entirely skip searching the private cache.

Figure 4:
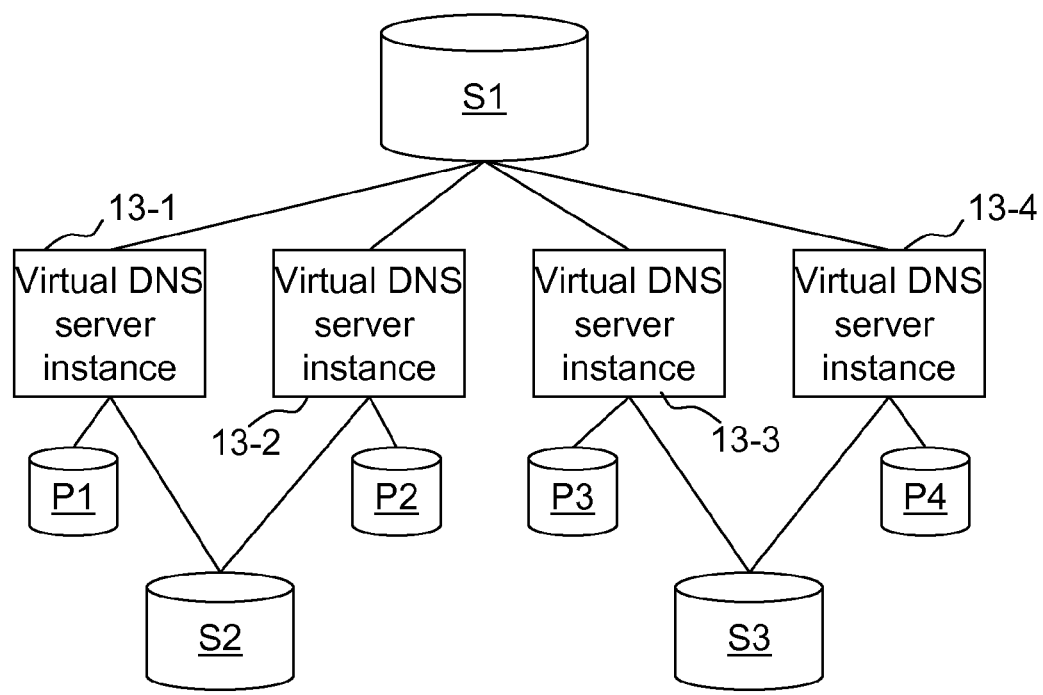
FIG. 4 is a schematic block diagram illustrating an alternative embodiment in which virtual DNS server instances have access to several shared caches at different hierarchical levels of sharing and respective private caches.

FIG. 4 is a schematic block diagram of a scenario with multiple shared caches S1, S2, and S3. Four virtual DNS server instances 13-1, 13-2, 13-3 and 13-4 are illustrated with respective private caches P1, P2, P3 and P4. All of the virtual DNS server instances 13-1, 13-2, 13-3 and 13-4 share the shared cache S1. However the shared cache S2 is only shared between the virtual DNS server instances 13-1 and 13-2, while the shared cache S3 is shared between the virtual DNS server instances 13-3 and 13-4. Thus a hierarchical structure of sharing can be created by means of multiple shared caches that are shared between different sets of virtual DNS server instances. Instance policy configuration of the respective virtual DNS server instances may control how different shared caches are used both relating to searches performed in the caches and how records are stored in the shared caches.

As mentioned above the DNS server 10 may be implemented in one or several DNS server nodes. The DNS server would generally be implemented by means of a combination of software and hardware. The virtual DNS server instances would generally be implemented as software modules. These software modules may be part of one or several computer program products embodied in the form of a volatile or non-volatile memory, e.g. a random access memory (RAM), an EEPROM, a flash memory or a disc drive. The computer product(s) may also comprise software modules for performing the method steps of FIG. 3. The shared and private caches described herein may also be embodied in the form of volatile or non-volatile memories.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A physical Domain Name System (DNS) server for use in a data network for resolving DNS queries from a number of clients, wherein the DNS server comprises:
   a plurality of virtual DNS server instances servicing different clients, the plurality of virtual DNS servers running on a single physical DNS server; and
   a shared cache, maintained in a cache memory of the DNS server, for caching records to be shared which indicate answers to resolved DNS queries, wherein the shared cache is shared between a set of multiple virtual DNS server instances, such that each virtual DNS server instance in said set of multiple virtual DNS server instances is configured to:
     cache records associated with DNS queries which have been resolved by the respective virtual DNS server instance in the shared cache; and
     resolve a DNS query by retrieving a shared cached record corresponding to the DNS query from the shared cache;
   the DNS server further comprising a number of private caches, maintained in the cache memory of the DNS server, for caching records which indicate answers, valid only for respective virtual DNS server instance to which each private cache is associated, to resolved DNS queries, and wherein only the virtual DNS server instance with which a private cache is associated is allowed to cache records in the private cache or retrieve records from the private cache.

2. The DNS server according to claim 1, wherein at least a first virtual DNS service instance is configured with an instance policy configuration that specifies domains for which associated records are to be stored in the shared cache and domains for which associated records are to be stored in the private cache associated with the first virtual DNS server instance.

3. The DNS server according to claim 1, wherein at least one virtual DNS server instance is configured to resolve a received query by retrieving a record corresponding to the received query primarily from the private cache, secondarily from the shared cache and lastly from another DNS server.

4. The DNS server according claim 1, wherein said set of multiple virtual DNS server instances, which share said shared cache, is a subset of the plurality of virtual DNS server instances of the DNS server.

5. The DNS server according to claim 1, wherein the DNS server comprises a plurality of shared caches for caching records which indicate answers to resolved DNS queries, wherein the plurality of shared caches are shared between different sets of multiple virtual DNS server instances respectively.

6. The DNS server according to claim 1, wherein the DNS server provides a DNS64 function.

7. A method in a Domain Name System (DNS) server for resolving DNS queries from a number of clients in a data network, the method comprising:
receiving a first DNS query from a first client;
determining a first virtual DNS server instance, from a plurality of virtual DNS server instances of the DNS server, for resolving the first DNS query;
the first virtual DNS server instance searching for a record corresponding to the first DNS query and indicating an answer to the first DNS query in a shared cache, wherein the shared cache is shared between a set of multiple virtual DNS server instances of the DNS server;
resolving the first DNS query by retrieving the record corresponding to the first DNS query from the shared cache if the record corresponding to the first DNS query was found in the shared cache;
receiving a second DNS query from a second client;
determining a second virtual DNS server instance for resolving the second DNS query from the plurality of virtual DNS server instances of the DNS server;
the second virtual DNS server instance searching for a record corresponding to the second DNS query and indicating an answer to the second DNS query in a private cache in which answers are valid only for the second virtual DNS server instance, wherein only the second virtual DNS server instance is allowed to cache records in the private cache or retrieve records from the private cache; and
resolving the second DNS query by retrieving the record corresponding to the second DNS query from the private cache if the record corresponding to the second DNS query was found in the private cache.

8. The method according to claim 7, further comprising resolving received DNS queries for which no corresponding record has been found in any cache of the DNS server by retrieving any corresponding record from another DNS server.

9. The method according to claim 8, further comprising storing the record corresponding to a selected DNS query, for which no corresponding record was found in any cache of the DNS server, in a selected cache of the DNS server, wherein the selected cache is selected based on an instance policy configuration of the virtual DNS server instance determined to resolve the selected DNS query, which instance policy configuration specifies domains for which associated records are to be stored in the shared cache and domains for which associated records are to be stored in the private cache associated with the virtual DNS server instance determined to resolve the selected DNS query.

10. The method according to claim 7, further comprising:
receiving a third DNS query from a third client;
determining a third virtual DNS server instance for resolving the third DNS query from a plurality of virtual DNS server instances of the DNS server;
the third virtual DNS server instance resolving the third DNS query by retrieving a record corresponding to the third DNS query primarily from a private cache associated with the third virtual DNS server instance, secondarily from the shared cache and lastly from another DNS server.

11. The method according to claim 7, wherein said set of multiple virtual DNS server instances, which share said shared cache, is a subset of the plurality of virtual DNS server instances of the DNS server.

12. The method according to claim 7, wherein the DNS server comprises a plurality of shared caches for caching records which indicate answers to resolved DNS queries, wherein the plurality of shared caches are shared between different sets of multiple virtual DNS server instances respectively.

13. The method according to claim 7, wherein the DNS server provides a DNS64 function.

* * * * *